US007822157B2

(12) United States Patent
Keller et al.

(10) Patent No.: US 7,822,157 B2
(45) Date of Patent: Oct. 26, 2010

(54) ACQUISITION AND TRACKING OF BURST CODE SIGNALS

(75) Inventors: Merle L. Keller, Salt Lake City, UT (US); Samuel Charles Kingston, Salt Lake City, UT (US); Steven Barham, Taylorsville, UT (US); Alan Earl Lundquist, Salt Lake City, UT (US); Zachary C. Bagley, Salt Lake City, UT (US); Warren Paul Willes, Alpine, UT (US); Raied N. Mazahreh, Salt Lake City, UT (US); Steven J. McEntire, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 1137 days.

(21) Appl. No.: 10/334,191

(22) Filed: Dec. 31, 2002

(65) Prior Publication Data
US 2004/0125868 A1   Jul. 1, 2004

(51) Int. Cl.
H04L 7/00 (2006.01)
H04L 7/04 (2006.01)
H04B 7/15 (2006.01)
H04B 7/185 (2006.01)

(52) U.S. Cl. .................. 375/354; 375/355; 375/367; 455/11.1; 455/12.1

(58) Field of Classification Search ............... 375/150, 375/354, 355, 362–367, 369–370; 455/11.1–12.1, 455/13.2
See application file for complete search history.

(56) References Cited

U.S. PATENT DOCUMENTS 4,550,414 A * 10/1985 Guinon et al. .............. 375/150
4,800,577 A * 1/1989 Tachita et al. .............. 375/340
4,808,939 A 2/1989 Kingston ................... 328/167
4,841,552 A 6/1989 Kingston .................... 377/43
5,022,048 A 6/1991 Kingston et al. ............. 375/1
5,060,180 A 10/1991 Kingston et al. ....... 364/724.03
5,062,071 A 10/1991 Kingston et al. ........... 364/733
5,084,913 A 1/1992 Kingston et al. ........... 375/115
5,099,494 A 3/1992 Kingston et al. ............. 375/1
5,101,370 A 3/1992 Kingston et al. ........... 364/733
5,105,437 A 4/1992 Kingston et al. ............. 375/1
5,128,958 A 7/1992 Kingston et al. ............. 375/1
5,134,631 A 7/1992 Kingston et al. ............. 375/1
5,506,863 A * 4/1996 Meidan et al. ............. 375/134

(Continued)

OTHER PUBLICATIONS

The MathWorks, Signal Processing Toolbox 6.10, 1994-2008, The MathWorks, pp. 1-12.*

*Primary Examiner*—David C Payne
*Assistant Examiner*—Linda Wong
(74) *Attorney, Agent, or Firm*—Kirton & McConkie; William T. Ralston (57) ABSTRACT

A digital communication system includes a generator for generating a plurality of pulse trains, each having a different timing, and pre-compensation circuitry for synchronizing the plurality of pulse trains to a timing signal. The system also includes comparison circuitry for simultaneously comparing a received burst code signal to each of the plurality of pulse trains, where the burst code signal is synchronized to the timing signal, and a detector for detecting which of the pulse trains is a closest temporal match to the burst code signal. The pre-compensation circuitry operates to reduce acquisition time and keep PN code uncertainties within the range of the comparison circuitry.

34 Claims, 7 Drawing Sheets

U.S. PATENT DOCUMENTS

| | | | |
|---|---|---|---|
| 5,574,754 A * | 11/1996 | Kurihara et al. | 375/367 |
| 5,615,236 A * | 3/1997 | Turney | 375/365 |
| 5,757,848 A * | 5/1998 | Hogberg | 375/150 |
| 6,122,506 A * | 9/2000 | Lau et al. | 455/427 |
| 6,201,843 B1 | 3/2001 | Kingston et al. | 375/350 |
| 6,233,459 B1 * | 5/2001 | Sullivan et al. | 455/456.2 |
| 6,564,064 B1 * | 5/2003 | Ciganer et al. | 455/456.1 |
| 6,788,731 B2 * | 9/2004 | Kim et al. | 375/142 |
| 6,836,506 B2 * | 12/2004 | Anderson | 375/145 |
| 6,879,913 B1 * | 4/2005 | Yu | 701/214 |
| 7,123,895 B2 * | 10/2006 | Greenspan et al. | 455/311 |
| 7,133,480 B2 * | 11/2006 | Colborne et al. | 375/355 |
| 2003/0108085 A1 * | 6/2003 | Keller et al. | 375/145 |
| 2003/0201934 A1 * | 10/2003 | Asher et al. | 342/357.12 |
| 2004/0076223 A1 * | 4/2004 | Krasner et al. | 375/143 |
| 2006/0170589 A1 * | 8/2006 | Park et al. | 342/357.02 |
| 2009/0322606 A1 * | 12/2009 | Gronemeyer | 342/357.12 |

* cited by examiner

ACQUISITION AND TRACKING OF BURST CODE SIGNALS

CROSS REFERENCES TO RELATED APPLICATIONS

The present application is related to U.S. Pat. Nos. 6,201,843, 5,134,631, 5,128,958, 5,105,437, 5,062,071, 5,099,494, 5,060,180, 5,084,913, 5,101,370, 4,841,552, 4,808,939, and 5,022,048.

BACKGROUND OF THE INVENTION

1. Field of the Invention

The present invention relates to signal correlation and, more particularly, to parallel correlation of burst code signals in a digital communications system using a timing signal and range rate pre-compensation circuitry to reduce acquisition time.

2. Brief Description of Related Developments

In digital communications systems, information from different sources may be transmitted in different time slots. At the beginning of each time slot, transmitted information may include a preamble having synchronization (sync) bits followed by a number of data bits. If a high data transmission rate is being used, it is important to rapidly detect and synchronize to the sync bits in order to detect as many data bits as possible.

Correlation circuitry is generally used for detection and synchronization. Presently there are correlators used for detection that employ a pseudo-noise (PN) generator generating code symbols at 325 MHz. At this rate, the resulting pattern repeats only once per day. Known acquisition techniques may achieve detection after receiving the code pattern approximately five times. Utilizing this type of generator requires approximately five days to attain acquisition, a time period that is too long to be practical.

It would be desirable to utilize a correlator that provides a more rapid correlation, for example, a correlator that indicates a high correlation probability during reception of synch bits and before data bits are received.

SUMMARY OF THE INVENTION

The present invention is directed to circuitry and techniques for initial acquisition and tracking of burst code signals using a timing signal and a spreading code relative-phase computation method. Rapid re-acquisition of each burst is accomplished using a parallel correlator to detect proper alignment of a locally generated de-spreading code and a received spread data burst.

The circuitry and techniques may be utilized in a wide variety of digital communication systems, and in particular by platforms that utilize digital technology for communication. The circuitry and techniques of the present invention are particularly suitable for use in airborne platforms operating in a TDMA communication system.

The present invention effectively slaves the PN chipping rate clock of each platform with a timing signal for initial acquisition of the code timing. In at least one embodiment, the timing signal is derived from the Global Positioning System (GPS). The relative phase between the timing signal and the spreading code is then maintained such that the code timing uncertainty falls within a parallel correlator window. Thus, the present invention makes it possible to acquire the code timing of a digital communication system by using a timing signal such as those provided by the GPS system, and a spreading code relative-phase computation method to effectively slave the chipping rate clocks of each platform to the timing signal. The mean time to re-acquire the code timing for each subsequent burst is significantly decreased by simultaneously correlating the received burst code signal over the uncertainty window of relative code phases of the locally generated de-spreading code. The size of the uncertainty window is reduced with the above mentioned timing signal-PN code slaving method. Thus, digital communication platforms are effectively synchronized to a timing signal, allowing initial PN code acquisition, tracking, and burst code signal re-acquisition to be accomplished in a physical system.

A detect/dismissal algorithm utilized by this technique is assumed to be a fixed-time method, i.e., the correlation is observed for a fixed time and then a detect or dismiss decision is made, so that an easy comparison to the conventional single channel user can be developed.

The purpose of the circuitry and techniques described herein is to decrease the mean time to code timing acquisition of a burst of data in a digital communication system, allowing the acquisition portion of the data block to be shorter, thereby increasing the system throughput. The code timing information is then passed to legacy circuitry that performs chip-by-chip dc-spreading, symbol rate matched filtering, time tracking, and carrier tracking.

In one embodiment, a method of acquiring a burst code signal includes generating a plurality of pulse trains, each having a different timing, and simultaneously comparing the burst code signal to each of the plurality of pulse trains, where the burst code signal and the plurality of generated pulse trains are synchronized to a timing signal. The method also includes detecting which of the pulse trains is a closest temporal match to the burst code signal.

In another embodiment a digital communication system includes a generator for generating a plurality of pulse trains, each having a different timing, and pre-compensation circuitry for synchronizing the plurality of pulse trains to a timing signal. The digital communication system also includes comparison circuitry for simultaneously comparing a received burst code signal to each of the plurality of pulse trains, where the received burst code signal is synchronized to the timing signal. The digital communication system further includes a detector for detecting which of the pulse trains is a closest temporal match to the received burst code signal. The pre-compensation circuitry operates to reduce acquisition time and keep PN code uncertainties within the range of the comparison circuitry.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
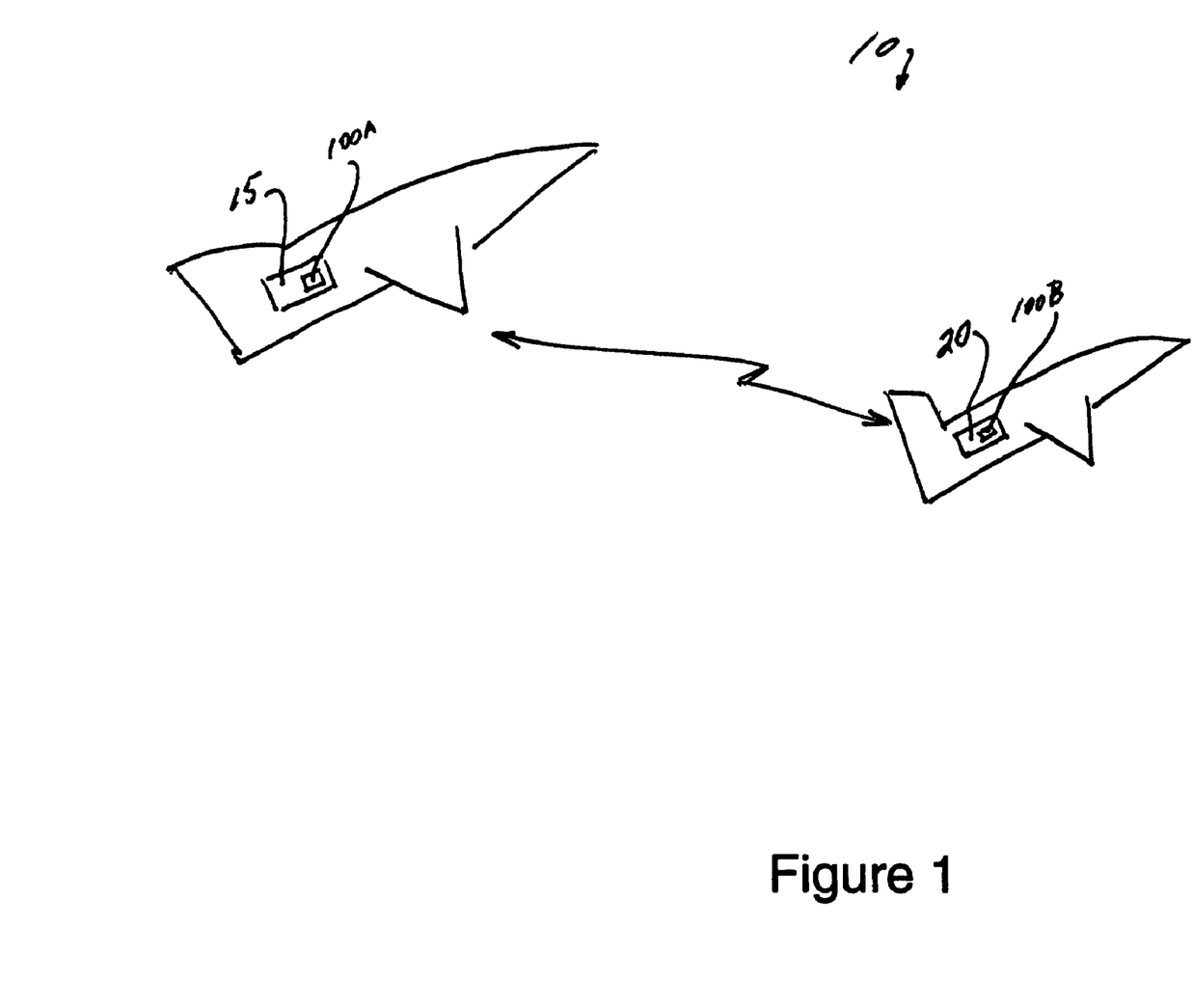
FIG. 1 shows a diagram of 2 aircraft that may utilize a digital communication system 10 including a first airborne platform and a second airborne platform.

FIG. 1 shows a diagram of 2 aircraft that may utilize a digital communication system 10 including a first airborne platform, referred to hereinafter as a central platform 15, and a second airborne platform, referred to hereinafter as a terminal platform 20. Central platform 15 and terminal platform 20 may use TDMA technology to communicate with each other. While the present invention may be discussed in the context of airborne platforms, it should be understood that the present invention may be utilized in any terrestrial or non terrestrial applications, including space, air, water, or land based applications, or combination of applications.

Figure 2:
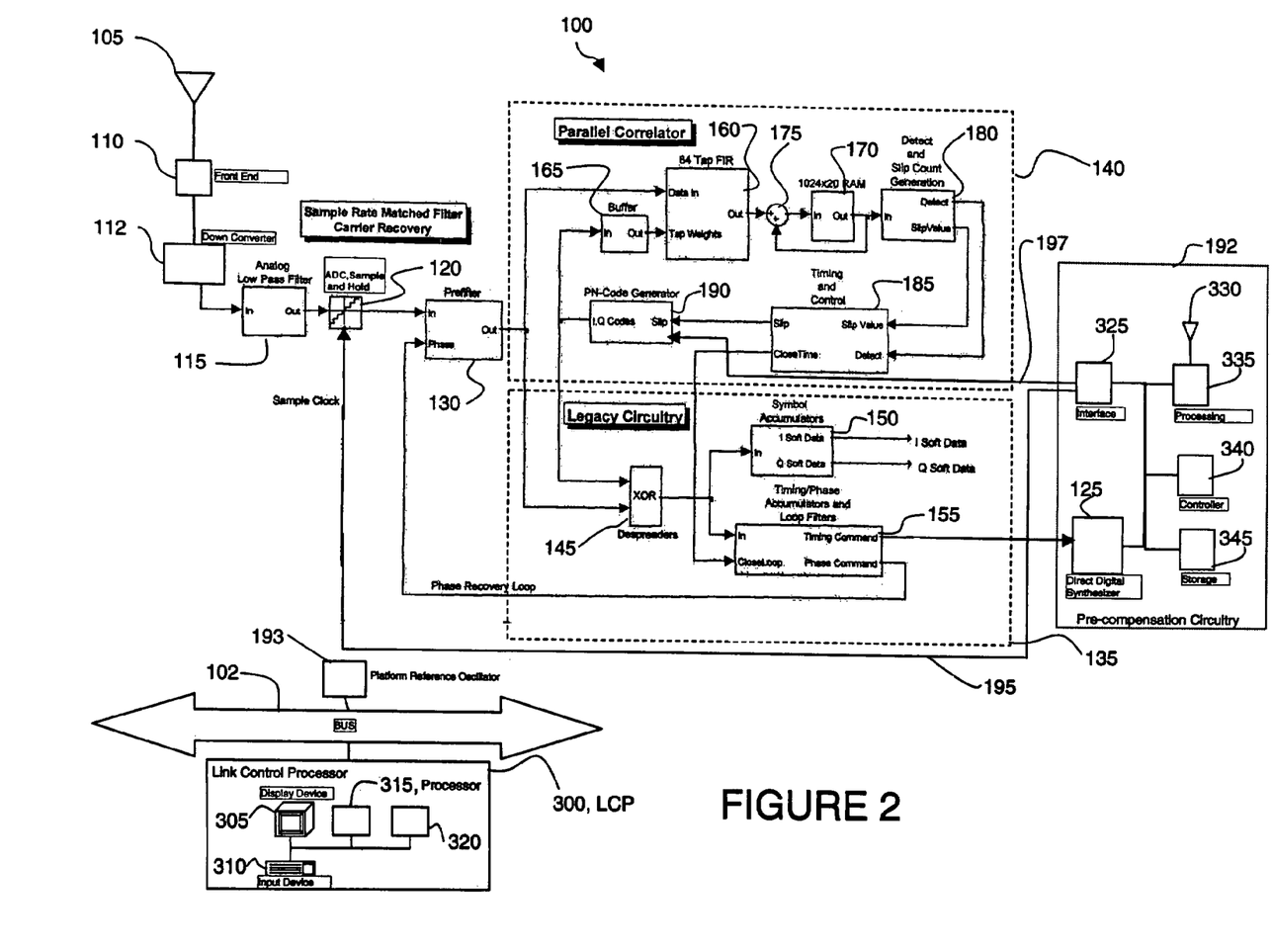
FIG. 2 is a block diagram of a digital demodulator system in accordance with the present invention.

Referring to FIG. 2, a block diagram of a digital demodulator system 100 incorporating features of the present invention is illustrated. Although the present invention will be described with reference to the embodiment shown in the drawings, it should be understood that the present invention can be embodied in many alternate forms. In addition, any suitable size, shape or type of elements or materials could be used. It should also be understood that central platform 15 and terminal platform 20 may each include an instance of digital demodulator system 100, shown as 100A and 100B, respectively.

According to the present invention, burst code timing acquisition time may be significantly decreased by simultaneously correlating received burst code timing with many phases of a locally generated de-spreading code. By passing the proper alignment to legacy circuitry, the ability to demodulate different rates on the In-phase and Quadrature channels in a digital communication system is preserved. Simultaneous comparison or parallel correlation may be implemented using a 64 tap finite impulse response (FIR) section with 1 bit weights and a 1024×20 dual-port block RAM to extend the effective length of the 64 tap FIR section to a possible 1024 tap FIR section.

A parallel correlator correlates received spread data burst over many phases (up to 1024 half-chip delays) of the locally generated de-spreading code in the same amount of time previous acquisition methods require to compute the correlation metric of a single code phase. This reduces the length of the acquisition preamble for each burst, thereby increasing the overall throughput of the digital communication system. Legacy (chip-by-chip) de-spreaders are aligned by holding the state of the local spreading code generator constant until alignment determined by the parallel correlator is achieved. The legacy circuitry is then used to track the burst timing and phase, preserving the ability to demodulate different data rates on orthogonal channels.

The parallel correlator may be described in mathematical terms. N cells in memory may be used to represent the result of correlating N received-to-local code phases over M symbols. In other words, after M symbols, the parallel correlator has performed correlations over N delays. Conventional code timing acquisition methods require at least N*M symbols to generate the same information, so one could expect a performance increase (reduction in acquisition time) on the order of 1/N.

Let $y_k$ be the output of the FIR filter (despread and accumulate function) at time k, then:

$$y_k = \sum_{n=0}^{N-1} (|r_{k-n} \cdot c_n|)^2 \quad \text{(Equation 1)}$$

where $c_j$ is the jth code bit (chip) and $r_{k-j}$ is the sampled output of the chip-rate matched filter at time k−j.

Now let $Y_{k-mN}$ be the mth vector of N FIR outputs where m=0, 1, . . . . M−1 and M is the number of symbols over which the detector will correlate. So:

$$Y_{k-m \cdot N} = [y_{k-m \cdot N} \, y_{k-m \cdot N-1} \cdots y_{k-(m+1) \cdot N-1}] \quad \text{(Equation 2)}$$

Now, let $X_k$ be the vector of correlations (Y's) after M symbols:

$$X_k = \sum_{m=0}^{M-1} Y_{k-mM} \quad \text{(Equation 3)}$$

$$= \left[ \sum_{m=0}^{M-1} [\, y_{k-m \cdot N} \quad y_{k-m \cdot N-1} \quad \cdots y_{k-(m+1) \cdot N-1} \,] \right]$$

$$X_k = \left[ \sum_{m=0}^{M-1} Y_{k-n \cdot M} \quad \sum_{m=0}^{M-1} y_{k-m \cdot N-1} \quad \cdots \sum_{m=0}^{M-1} y_{k-(m+1) \cdot N-1} \right] \quad \text{(Equation 4)}$$

$$X_k = \left[ \sum_{m=0}^{M-1} \sum_{n=0}^{N-1} (|r_{k-m \cdot N-n} \cdot c_n|)^2 \, \cdots \right. $$
$$\left. \sum_{m=0}^{M-1} \sum_{n=0}^{N-1} (|r_{k-(m+1) \cdot N-1-n} \cdot c_n|)^2 \right] \quad \text{(Equation 5)}$$

Thus, it can be seen that $X_k$ is a vector of cross-correlations of the received signal ($r_k$'s) and the locally generated de-spreading code ($C_n$'s) accumulated over M symbols. Note that this is the time-average estimate (up to a scale factor of 1/M) of the cross-correlation sequence between the received signal and the locally generated de-spreading code.

The functional block diagram of FIG. 2 shows the principles described above, as embodied in the digital demodulator system 100 according to the present invention. While significant functional connections are shown between the components of the digital demodulator system 100 in FIG. 2, it should be understood that all components are also functionally connected to a common bus 102 that provides a communication path among all the components. Common bus 102 may also provide power, ground, interrupt lines, and generally serve as an interface to all components shown in FIG. 2 as well as other circuitry or functions outside digital demodulator system 100. A signal from a platform reference oscillator 193 may also be connected to common bus 102 and may be made available to all components of digital demodulator system 100 through common bus 102 or through other connections.

A link control processor 300 is connected to common bus 102 and operates to provide overall control of the components of digital demodulator system 100 and may issue commands for initializing, setting values and parameters, initiating processes, and generally controlling the operation of the components of digital demodulator system 100. Link control processor 300 may include a display device 305, an input device 310, a processor 315, and a storage medium 320. Processor 315 operates to process commands stored in storage medium 320 to generally direct the operations of digital demodulator system 100. Display device 305 and input device 310 may serve as a user interface for allowing a user to initiate commands and to generally operate digital demodulator system 100.

Digital demodulator system 100 includes an antenna 105 for receiving signals. If the received signals are transmitted over wire or fiber optical cable, then antenna 105 can be eliminated. Antenna 105 is connected to front end 110 having signal conditioning circuitry, for example, amplifiers, filters, etc. Front end 110 is connected to down converter 112 which converts the received signals to baseband or near-baseband. If the received signals are already at baseband, then all or part of front end 110 and down converter 112 may be eliminated. The baseband signals are applied to an anti-aliasing low pass filter 115. As an example, low pass filter 115 may be a 1-pole analog low pass filter with a cutoff frequency of one twentieth to one tenth of the data rate, e.g., from near 0 to 650 MHz.

The output signal from low pass filter 115 is applied to analog-to-digital converter (ADC) 120, shown in this embodiment as a sample and hold circuit. ADC 120 also receives a sample clock signal from pre-compensation circuitry 192. ADC 120 samples the signal from low pass filter 115 at a rate of, for example, 1 to 30 samples per data bit, and then digitizes the sampled signal to provide a digital signal to digital prefilter 130. Examples of digital prefilters may be found in U.S. Pat. Nos. 5,134,631, 5,062,071, 5,101,370, 4,841,552, and 4,808,939.

Digital prefilter 130 also receives a phase control signal for digital carrier recovery and for canceling residual phase and frequency error. Digital prefilter 130 may be implemented in hardware for maximum speed, but can be implemented in software or a combination of hardware and software. Digital prefilter 130 provides decimation if ADC 120 over samples its input signal and reduces noise present in the ADC output by acting as either a low pass filter or a high pass filter as required. The output signal from prefilter 130 is applied to legacy circuitry 135 and to parallel correlator 140. Legacy circuitry 135 comprises an exclusive OR (XOR) gate 145, which performs despreading and provides a despread signal to symbol accumulator 150 and to timing/phase accumulators and loop filters 155. Symbol accumulator 150 provides in phase (I) and quadrature (Q) soft data output signals to other circuitry, for example, a forward error correction decoder (not shown). Timing/phase accumulators and loop filters 155 provide a phase command output signal to prefilter 130 and a timing command output signal to DDS 125. Examples of symbol accumulators are shown in U.S. Pat. Nos. 5,062,071 and 5,101,370. Examples of timing/phase accumulator and loop filters are shown in U.S. Pat. Nos. 5,062,071, 5,060,180, 5,101,370 and 5,022,048.

In parallel correlator 140, the data output signal from digital prefilter 130 is applied to a finite impulse response (FIR) filter 160. In this embodiment, FIR filter may be a 64 tap FIR filter. FIR filter 160 also receives a tap weight signal from buffer 165. FIR filter 160 may operate at 64 times the data symbol rate, and thus performs a comparison by providing 64 alignments of the received signal with 64 stored values of sync bits. FIR filter 160 removes distortion caused by the low cutoff frequency (if used) of low pass filter 115. Its tap weights are determined by the ratio of the sampling frequency to the data symbol frequency. FIR filter 160 may provide a 16-bit correlation value output signal (8-bits real and 8-bits imaginary) to 16-bit adder 175 and then to random access memory (RAM) 170. RAM 170 can be organized as 1024×20 bits.

Each correlation value is stored in RAM 170. Feedback is provided using adder 175 for word lengths longer than 64 bits so they can be handled 64 bits at a time. The output signal from RAM 170 is provided to detect and slip count generator 180, which may also comprise a 64 tap FIR filter. Detect and slip count generator 180 operates as a detector, where all 64 correlation values are examined in one data bit symbol time.

An example of a detect and slip count generator can be found in U.S. Pat. No. 5,105,437. The detect and slip count generator disclosed in U.S. Pat. No. 5,105,437 may be modified to accept parallel input data by replacing single bit storage devices with multi-bit storage devices e.g., shift registers.

Detect and slip count generator 180 outputs a base value (shown as a detect signal) as well as a slip value to timing and control circuit 185. From timing and control circuit 185, a close time signal is provided to timing/phase accumulators and loop filter 155, and a slip signal is applied to a pseudo noise (PN) code generator 190, which may be, for example, a linear feedback shift register. PN code generator 190 receives timing information from platform reference oscillator 193 for controlling the chipping rate of its output. PN code generator 190 provides a signal to buffer 165 and exclusive OR (XOR) gate 145, mentioned above.

Digital demodulator system 100 also includes range and range rate pre-compensation circuitry 192, which will be described in detail below. Pre-compensation circuitry 192 provides a chipping rate adjustment signal through signal line 197 to PN code generator 190. The chipping rate adjustment signal is used to adjust the output of PN code generator 190 so that the correlation search may be performed over a narrow time window, which may be, for example, expressed in milliseconds. In particular, the chipping rate adjustment signal may operate to adjust the output of PN code generator 190 to be within the impulse response time of FIR filter 160.

Figure 3:
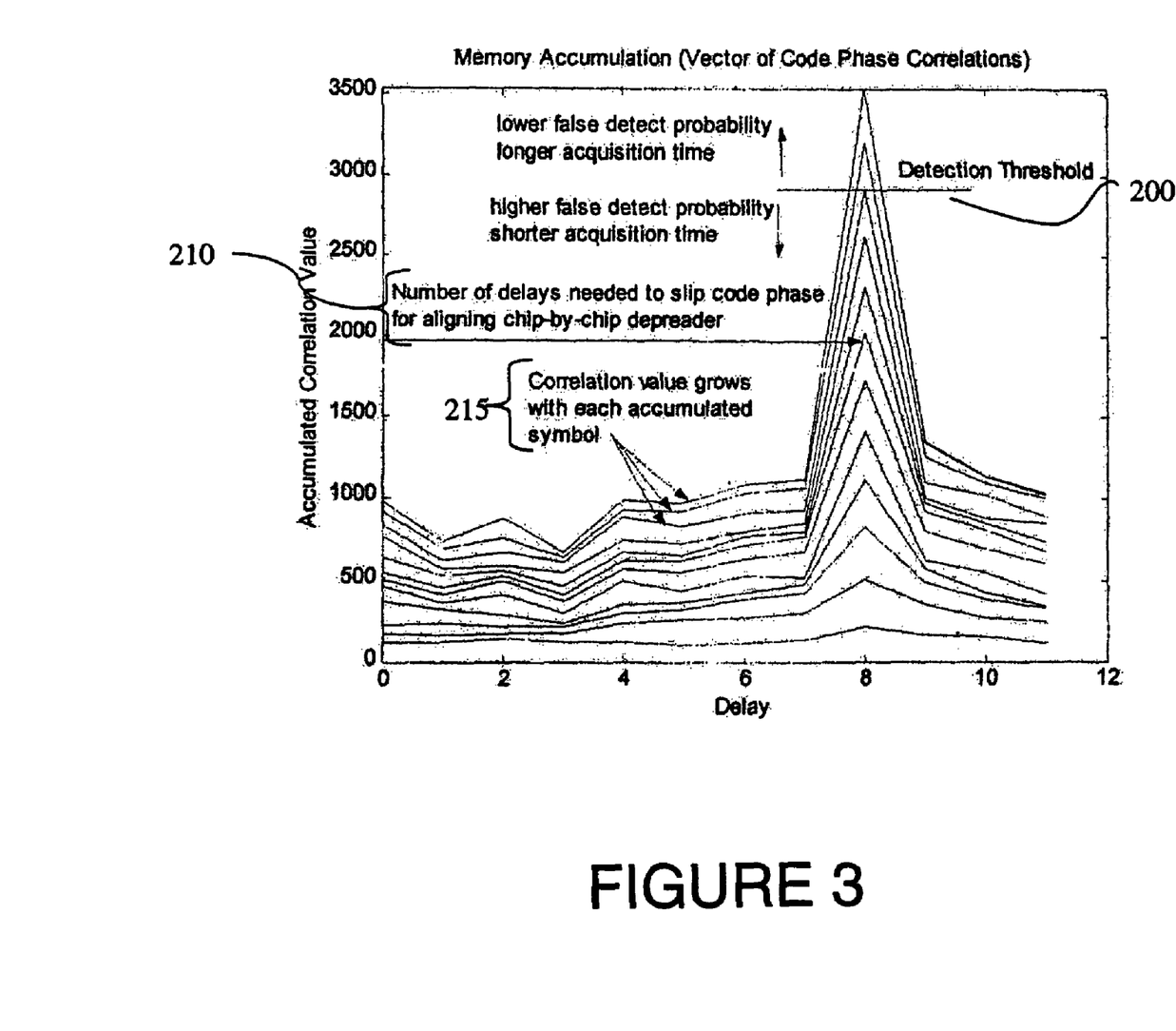
FIG. 3 shows the results of a simulation of the circuitry shown in FIG. 1.

FIG. 3 shows the results of a simulation of the circuitry of FIG. 2 for a representative data set of values held in RAM 170. Each delay, as shown on the X-axis, corresponds to a particular phase code correlation value after accumulating the outputs from finite impulse response filter 160 over a specified number of symbols.

From the simulation, it can be seen that for a properly chosen spreading sequence, the maximum cross correlation value is readily distinguishable. FIG. 3 shows at 215 that the correlation value grows with each accumulated symbol correlated signal. Item 210 shows the number of delays by which to slip the code phase for aligning the chip by chip despreader. Item 200 designates an example detection threshold. As the detection threshold rises, the probability of false detection decreases while the acquisition time increases. Correspondingly, as the detection threshold decreases, the probability of false detection increases while the acquisition time decreases.

Referring to equations 1-5 and to FIG. 2, the position of the maximum (arg max X(k)) yields the information required to align the legacy circuitry 135. Determining arg max X(k) is accomplished using detection algorithms. A single channel algorithm may produce fast dismissal of unlikely correlations. This may be accomplished by subtracting a bias value at each accumulation step and comparing the accumulator output to zero. The code phase being correlated can be dismissed as unpromising before all M accumulations are performed by properly setting the bias value such that the subtraction operation produces a negative result for bad code phases and a positive result for the proper code phasing.

A reduction in search time by N over the single channel case can be achieved for the fixed-time observation method. However, achieving the same performance gain when the single channel is sequentially searched as described above, requires N full acquisition detectors with each detector given the next delay to be searched as soon as the current delay is dismissed. Because the implementation of FIG. 2 utilizes finite impulse response filter 160, it is advantageous to consider algorithms which dismiss entire blocks of delays.

These algorithms may be slower since all N delays must be dismissed before the next block can be searched, furthermore the dismissal thresholds must be lower to avoid dismissing cases where multiple weak channels are detectable within the block. Even so, some performance increase over the fixed time observation method for the multiple channel parallel correlator can be gained by utilizing a simple early dismissal algorithm which dismisses a block whenever all correlation values stored in RAM 170 are below zero. Dismissal of the block will result in a slip of K delays, where K may be less than N so that clusters of correlations may be captured in a single block.

For a particular block of data the weighting function should be more elaborate than a simple bias subtraction as in the single channel case. The parallel correlator 140 operates to pass each delay correlation value through a non-linear function approximating the log likelihood ratio function, combines the weighted delay values, and compares the result to a threshold.

Referring to FIG. 2, pre-compensation circuitry 192 may include an interface 325 to parallel correlator 140 and to ADC 120, an antenna 330, processing circuitry 335, a controller 340, a program storage device 345, and a direct digital synthesizer (DDS) 125. A timing signal is received by antenna 330 or may optionally be received by antenna 105. Alternately, the timing signal may be otherwise provided as a received timing signal to pre-compensation circuitry 192. The received timing signal is conveyed to processing circuitry 335. Processing circuitry 335 includes circuitry for extracting timing information from the received timing signal, and may include for example, a phase locked loop circuit for tracking the received timing signal. Processing circuitry 335 may include amplifiers, calculation circuitry, digital signal processors, microprocessors, analog to digital converters, digital to analog converters, memory, and various support circuitry.

Controller 340 is generally adapted to utilize program storage device 345 embodying machine readable program source code which is adapted to cause controller 340 to perform the functions for producing a chipping rate adjustment signal or command and may produce such, an adjustment signal by utilizing the resources of processing circuitry 335 and DDS 125. DDS 125 generally operates to provide a PN clock to PN code generator 190 through signal line 197.

Program storage device 345 may include magnetic media such as a diskette or computer hard drive, which is readable and executable by controller 340. In other alternate embodiments, program storage device 345 could include a floppy disk, an optical disk, read-only-memory ("ROM"), random access memory (RAM), any type of semiconductor based storage, or other storage devices suitable for storing information. Controller 340 is operable to execute programs stored on program storage device 345.

While described in the context of circuitry having processors, amplifiers, calculation circuitry, digital signal processors, a controller, storage device, etc., it should be understood that and pre-compensation circuitry 192 may be implemented in hardware, software, or any combination of hardware and software suitable for performing the operations described herein.

Pre-compensation circuitry 192 generally executes programs stored on program storage device 345 that include an adjustment method for reducing the uncertainty of the correlation performed by parallel correlator 140 to within the time span accommodated by FIR 160. Pre-compensation circuitry 192 performs an adjustment method to synchronize the PN code phase of PN code generator 190 with the timing signal.

In a communication system with a plurality of platforms, each having a digital demodulation system 100, this is advantageous in that each digital demodulation system 100 may be synchronized to the timing signal, such that the uncertainty of the correlation performed by parallel correlator 160 is reduced to within the time span accommodated by FIR 160.

The adjustment method may include synchronizing the chipping rate of PN code generator 190 with the timing signal, or bringing the chipping rate of PN code generator 190 into approximate agreement with the accuracy of the timing signal. The operation of synchronizing or bringing the chipping rate into agreement is also referred to as a clock correction technique. Once the clock rate of PN code generator 190 has been corrected to approximate the clock rate of the timing signal, the adjustment method may operate to maintain the composite PN code phase of PN code generator 190 substantially coincident with the phase of the timing signal, also referred to as a phase maintenance technique. The phase maintenance technique may also include a reverse Doppler algorithm that operates at the carrier frequency and detects deviations from the nominal carrier frequency.

One example of a timing signal includes a signal provided by the GPS system. In one embodiment, GPS information from a GPS satellite constellation is received by antenna 330, which may be a GPS antenna, or optionally by antenna 105.

In this embodiment, processing circuitry 335 includes circuitry for extracting timing information from the GPS information, in particular GPS time of day information. As part of this embodiment, pre-compensation circuitry 192 performs an adjustment method to adjust the PN code phase of PN code generator 190 to have the same phase as it would have had it begun at the beginning of a GPS day and progressed at a nominal chipping rate ideally achieved with a reference oscillator used in the GPS system.

When the timing signal is a GPS signal, the clock correction technique operates to bring the chipping rate of PN code generator 190 approximately to GPS accuracy. Correspondingly, the phase maintenance technique operates to maintain the composite PN code phase of PN code generator 190 substantially at GPS time of day.

While the adjustment method is discussed in the context of correcting and maintaining phase with respect to GPS related timing and GPS signals, it should be understood that the adjustment method may utilize any timing signal, or signal derived from a timing signal, that may be available to digital demodulation system 100.

In the embodiment utilizing GPS, the adjustment method begins by utilizing the clock correction technique for correcting the chipping rate to GPS clock speed. The amount of disagreement between GPS clock speed and the rate of platform reference oscillator 193 may be shown conceptually as:

$$A_{CLK} = \frac{\Delta TSI\_GPS\_1 \ \mu s - \Delta TSI\_Modulator\_XY\_25.6 \ \mu s}{t_2 - t_1} \quad \text{(Equation 6)}$$

Equation 6 shows that in a given time period common to both the GPS clock and platform reference oscillator 193 ($t_2-t_1$), GPS measures the time duration relative to its clock, and pre-compensation circuitry 192 measures the same time duration relative to platform reference oscillator 193. The disagreement between them, divided by the duration of time, measured by the defined standard, is equal to the number of seconds of disagreement per seconds of duration, the definition of clock accuracy, $A_{CLK}$, (TSI is an acronym for Time Since Initialization.)

Equation 6 indicates that TSI measurements for a platform 15, 20 are derived by means of the platform's transmit modulator (not shown). Platform reference oscillator 193 is used to drive the platform's transmit modulator and therefore the platform's transmit modulator may be used to determine the speed of platform reference oscillator 193. The following relationship is used to relate the transmit modulator's PN code phase to the platform's TSI:

$$Y_{PN} = TSI_{\to SC} + \Delta Y_{PN} \quad \text{(Equation 7)}$$

Equation 7 states that the PN composite code phase is equal to the time since initialization, which has an exact conversion into sampling clocks at an XY epoch, plus delta phase, which is a combination of accumulated phase and intentional slips and advances (assembled component code phase). The numerical value of delta phase is maintained in units of sampling clocks. Expressed another way, equation 7 says that if the sampling rate were the nominal, free-running sampling rate, the composite code phase (expressed in sampling clocks) would equal the exact TSI-to-sampling-clocks number of sampling clocks. In the absence of a free-running sampling rate, the composite code phase (expressed in sampling clocks) is equal to the free-running number of sampling clocks plus the number that deviated from that (which is delta phase). Accurate to the granularity of a TSI 25.6 µs LSB, the conversion from TSI to sampling clocks is as follows:

$$TSI\_25.6\,\mu s \to SC = TSI\_25.6\,\mu s \times \text{samprate} \times \frac{3}{2^{19}} \quad \text{(Equation 8)}$$

At an XY epoch, the PN composite code phase must be an integer multiple of an XY number of chips, converted to sampling clocks. Samprate is a seedword for DDS 125 used to generate the sampling rate clock. An XY epoch may latch a TSI counter immediately after the counter has incremented to a fresh 25.6 µs LSB, or an XY epoch may latch a TSI counter virtually at the end of a TSI LSB, making the latched TSI practically 25.6 µs latent. At the maximum sampling rate (325 Msc/s) of digital demodulator system 100, 8320 sampling clocks can occur in 25.6 µs (one sampling clock can equal one chip). Therefore, a conversion from TSI LSBs to sampling clocks can range from being exact, to being as much as 8320 too few. If 8320 sampling clocks were added to a TSI-to-sampling-clock conversion, the conversion could range from being exactly correct, to 8320 sampling clocks too many. By adding 10,000 sampling clocks (an arbitrary, round figure) to a TSI-to-sampling-clock conversion, a composite code phase larger than an integer number of XY chips (expressed in sampling clocks) is guaranteed, as follows:

$$Y\_PN\_Plus = TSI\_XY\_25.6\,\mu s \to SC + \Delta Y\_PN + 10{,}000 \quad \text{(Equation 9)}$$

Equation 9 shows that if 10000 (sampling clocks) is added to the XY-latched TSI, converted to sampling clocks, and added to delta phase (the current delta phase at the time the XY epoch occurred), the resulting composite code phase is guaranteed to be somewhat larger than the actual modulo XY composite code phase, in terms of sampling clocks (10,000 is large enough to accommodate all possible chipping or sampling rates and is small enough to be much less than an XY number of chips). The actual modulo composite code phase is calculated as follows:

$$Y\_PN = Y\_PN\_Plus - (Y\_PN\_Plus\,MOD(L_{XY} \times SCPC\_Mod)) \quad \text{(Equation 10)}$$

Equation 10 gives the sampling-clock-exact composite code phase at the time of the XY epoch, where SCPC_Mod is the number of sampling clocks per chip of the platform's transmit modulator. Having calculated this sampling-clock-exact composite code phase, it is possible to make the following substitution, using equation 7.

$$TSI_{\to SC} = Y_{PN} - \Delta Y_{PN} \quad \text{(Equation 11)}$$

Equation 11 can be used to transform the conceptual expression of equation 6 into an equation that can be calculated, using information and parameters available to link control processor 300.

$$A_{CLK} = \frac{1E6\,(\mu s)}{t_{GPS2} - t_{GPS1}} \left[ \frac{t_{GPS1} - t_{GPS2}}{1E-6} - \left[ \frac{\theta PN_{Mod1} - \Delta\theta PN_{Mod1} - (\theta PN_{Mod2} - \Delta\theta PN_{Mod2})}{\frac{\text{samprate} \times 3 \times 5^7}{2^{20}}} \right] \right] \quad \text{(Equation 12)}$$

The largest uncertainty associated with $A_{CLK}$, by far (allowing all others to be neglected), is due to the granularity of GPS time measurements. The GPS LSB is 1 µs; it tells the same time for a full microsecond. The platform's transmit modulator's XY epoch can arrive immediately after GPS time has incremented to its most current time, or the XY epoch can arrive when the GPS LSB is its most latent. Therefore, modulator-XY-epoch-latched GPS time equals GPS_latched_time+0/−1 µs. The uncertainty associated with the difference between two such latched times is ±1 µs.

The accuracy of $A_{CLK}$ is ±1 µs/(t2−t1). Given a duration of 100 seconds, the accuracy of $A_{CLK}$ is ±1 E−8(±1 µs/(100 sec)). At the general-solution, maximum chipping rate of 325 Mc/s (or 325 Msc/s), ±1E−8×325M=±14.5 DDS LSBs. In other words, after as much as 100 seconds, clock agreement between a platform 15, 20 and the GPS system may only be known to approximately ±14 or ±15 DDS LSBs because of the (relatively) coarse granularity (and concomitant uncertainty) of GPS time. It takes 2900 seconds (48 minutes) to ascertain clock disagreement within one half DDS LSB, as calculated in equation 13 below, where Δt equals 2900 seconds:

$$\frac{\pm 1\,\mu s}{\Delta t} = \frac{0.2235\,\text{Hz}/DDS\,\text{LSB}}{2 \times 325\,\text{M}} \quad \text{(Equation 13)}$$

A listing of various integration times is given in Table 1 along with associated accuracies and uncertainties in terms of DDS LSBs. If a clock correction term were added to the chipping rate after just 100 seconds, more good than harm is likely to result; it guarantees that the chipping rate is within 1E−8, which is a good starting point. Clock correction can begin with as little as 100 seconds of integration, but to achieve the full accuracy of DDS granularity, the integration period should be allowed to grow to 2900 seconds and should be maintained at 2900 seconds.

TABLE 1

| ΔTIME (SEC) | ±1 μSEC/ΔTIME (± PARTS/PART) | UNCERTAINTY ± 1 DDS LSBS PREVIOUS COLUMN × 325 m/0.2235) |
|---|---|---|
| 100 | 1E-8 | 14 |
| 200 | 5E-9 | 7 |
| 1000 | 1E-9 | 1.4 |
| 2000 | 5E-10 | .7 |
| 2900 | 3.4E-10 | .5 |

Referring to Equation 12, $A_{CLK}$, requires three parameters taken twice (three at the beginning and three at the end of the time period (integration time) under consideration): t_GPS_n, θ_PN_n, Δθ_Mod_n, where t_GPS_n is GPS time of sample n in GPS LSBs, θ_PN_n is the composite code phase of the platform's transmit modulator at sample n in units of sampling clocks as derived by equation 10, and Δθ_Mod_n is the platform's transmit modulator's delta phase at the time sample n is taken (already in units of sampling clocks). A set of three parameters can be added every 100 seconds to a kept list until the list is 30 sets long ($t_0$ to $t_{29}$). $A_{CLK}$ can be calculated using the first and last sets of the kept list, beginning with two samples at 100 seconds. After the kept list acquires 30 sets, room for the 31st set can be made by pushing out the oldest set in FIFO (first in, first out) fashion. The $A_{CLK}$ list must slide in order to track temperature-induced changes in platform reference oscillator 193.

If the sense of $A_{CLK}$ is positive, it means that platform reference oscillator 193 is running faster than the reference oscillator used by the GPS system. In such a case, the platform's transmit modulator's chipping rate should be slowed.

Once $A_{CLK}$ is calculated using equation 12, an adjustment term ModΔDDS may be calculated for the platform's transmit modulator using equation 14. In equation 14, the double lines are intended to indicate that the integer portion is taken.

$$Mod\Delta DDS = -\|A_{CLK} \times \text{Samprate}\| \quad \text{(Equation 14)}$$

Equation 14 is preferably calculated each time Samprate changes. The ModΔDDS term may be used to calculate a correction term CorrΔDDS for PN code generator 190.

CorrΔDDS is calculated somewhat differently than ModΔDDS because DDS granularity introduces an error into ModΔDDS. The most accurate way to calculate CorrΔDDS so that it most closely agrees with ModΔDDS is to calculate it using ModΔDDS as follows:

$$Corr\Delta DDS = -\left\|Mod\Delta DDS \times \frac{R_x\_\text{Samprate}}{T_x\_\text{Samprate}}\right\| \quad \text{(Equation 15)}$$

If Rx_samprate and Tx_samprate are the same, CorrΔDDS is the same as ModΔDDS. After the first 100 to 300 seconds and after the application of an initial to third ModΔDDS, consideration should be given to changing ModΔDDS only if two consecutive $A_{CLK}$'s agree within 2 DDS LSBs to the same ModΔDDS as a way of filtering out corrupted data. $A_{CLK}$ does not change its value when ModΔDDS is applied; clock disagreement is still the same after ModΔDDS is applied. Once calculated, CorrΔDDS may be conveyed to PN code generator 190 through signal line 197, or alternately through common bus 102.

CorrΔDDS is generally used in the absence of a received signal. The objective is to align and slave the PN code phase of the platform 15, 20 to GPS time so that PN code phase uncertainties are small when signals are received. Once a signal is acquired, which acquisition is aided by small uncertainties, CorrΔDDS may be ignored and the phase locked loop of processing circuitry 335 may be used to track the received signal.

As mentioned above, once the clock rate of PN code generator 190 has been corrected to GPS clock speed, the adjustment method utilizes a phase maintenance technique to maintain the composite PN code phase of PN code generator 190 at GPS time of day. To accomplish this, GPS time of day is first defined, beginning with the definition of a modulo GPS day as follows:

$$GPS_0 = GPS@\text{Initialization} - GPS@\text{Initilization MOD} \quad 86,400,000,000 \quad \text{(Equation 16)}$$

Equation 16 calculates GPS time at the beginning of the current GPS day (a modulo GPS day), given 86.4 billion microseconds (GPS LSBs) per day. Thereafter, GPS time of day is the GPS time at the sample of interest minus $GPS_0$. GPS code phase at the sample of interest, $\theta GPS_n$, is the calculated, ideal PN code phase, GPS would have had it generated a PN code, beginning at the beginning of the GPS day and progressed at the nominal chipping rate that ideally would be achieved with the GPS reference oscillator, expressed as follows:

$$\theta GPS_n = (GPS\text{ time} - GPS_0) \times \frac{1 \times 10^{-6}}{\text{GPS\_LSB}} \times \frac{\text{Samprate} \times 3 \times 5^7}{\text{SCPC\_Mod} \times 2^{20}} \text{ chips} \quad \text{(Equation 17)}$$

$\theta PN_{Mod}$, the composite code phase of the platform's transmit modulator at the XY epoch of interest, is given by equation 10 in units of sampling clocks. The conversion to chips is accomplished by taking the result of equation 10 and dividing by SCPC, the number of sampling clocks per chip.

At first look, it may appear that the composite code phase difference between GPS and the platform's transmit modulator PN code is simply $\theta GPS_n - \theta Mod_n$, referred to hereafter as ΔθGPS/Mod. However, latched GPS time is either correct or as much as 1 μs latent, making a composite code phase difference calculation as uncertain as zero to as many sampling clocks as can occur in 1 μs. At 120 Mc/s and SCPC equal to 2(240 Msc/s), 240 sampling clocks occur in 1 μs. Because GPS time and the occurrence of transmit modulator XY epochs are asynchronous events, it is assumed that the uncertainty of a composite code phase difference calculation is equally likely to be any number between 0 and 1 μs (expressed in sampling clocks).

Simulations indicate that the shortest possible time is best from one corrective action to the next, in response to a ΔθGPS/Mod calculation for each corrective action. The shortest possible time, therefore, is a transmit modulator XY epoch; a fresh ΔθGPS/Mod result is available only once per modulator XY epoch.

The best rate of recovery is generally the longest time period that still allows gradients to be tracked. (Gradients refer to changes over time of the frequency of platform reference oscillator 193 due to changes in temperature. The above-mentioned simulation allowed for a change of ±1E−8 per 30 minutes; platform reference oscillator 193 is at worst case specified to change its frequency by as much as this amount over the operating temperature range. An arbitrary time allowance for this event is 30 minutes.) If the calculated ΔθGPS/Mod were to be recovered by the time of the next occurring transmit modulator XY epoch, as many as 240 sampling clocks would accumulate in an XY epoch (keeping with the 120 Mc/c example). The longer the recovery time is, the smaller the rate of phase accumulation is and the smaller the maximum deviation is from true phase agreement between θGPS and θMod (in the absence of gradients to be tracked). An approach to ΔθGPS/Mod corrective action is presented as follows:

$$\text{Mod}\xi DDS = \left\| \frac{\Delta\theta GPS/\text{Mod}}{\text{Gain}} \times \frac{2^{20}}{3 \times 5^7} + \frac{\text{Samprate} \times 1\ \mu s}{2 \times \text{Gain}} \right\| \quad \text{(Equation 18)}$$

Equation 18 says that a certain phase difference is measured: ΔθGPS/Mod. Gain scales ModξDS in such a way that a Gain$^{th}$ of that difference will be recovered per second. In equation 18, ΔθGPS/Mod is converted into DDS LSBs. The second (Samprate) term of equation 18 biases ModξDDS to compensate for the +0/−1µ error of the θGPS$_n$ measurement. On the average, ModξDDS would be 0.5 µs (in DDS LSBs) too small if it weren't for the second term of equation 18. Based on simulations, 50 is a good number for Gain—in the long-term.

Both ModξDDS and ModΔDDS are DDS terms that affect the chipping rate. However, ModΔDDS is a slow-moving, long-term correction to the chipping rate, whereas ModξDDS is a fast-moving, short-term correction to the chipping rate. The Greek letter ξ is intended to imply that ModξDDS's charter is to correct for small, short-term phase-difference errors.

Without clock correction (a ModΔDDS term calculated and in place, affecting the chipping rate), phase maintenance is practically out of the question. If clock disagreement is 1E−7 at 240 Msc/s, delta phase accumulates at 24 sampling clocks per second. If the Gain term were 10, the delta phase quiescent point would be 240 sampling clocks. A clock correction term would be of some help as early as 40 seconds following the adjustment of θMod to equal θGPS. At 40 seconds, $A_{CLK}$ accuracy is not outrageous, and it could help a losing battle possibly being fought by ModξDDS. If a ModΔDDS were applied at 40 seconds, the rate of delta phase accumulation would be dramatically slowed, allowing ModξDDS to gain some ground. This scenario could be substantially protracted, but it can be seen that without a clock correction term in place, phase maintenance is most likely a lost cause (depending on the magnitude of clock disagreement) with large delta phase disagreements between θMod and θGPS and fast rates of delta phase accumulation, not to mention the complexity of firmware needed to orchestrate the transition from start-up parameters to long-term maintenance parameters.

Therefore, a clock correction term should be in place before phase maintenance begins. Clock correction should be given an initial period, for example 100 seconds, to calculate the first ModΔDDS. After ModΔDDS is in place, θMod can be slipped (or advanced) to bring it into agreement with θGPS, at which time ModξDDS should approximately equal zero.

Even after a ModΔDDS is in place, there are further considerations for initiating phase maintenance. At the instant that θMod is slipped or advanced to equal θGPS, the error associated with the phase calculation may be as large as 1 µs (expressed in sampling clocks). Assuming that it is important to reduce the initial-placement error as quickly as possible, the Gain term should be reasonably small, on the order of 10. A small Gain term allows for quick recovery, but it also allows for rapid phase accumulation and large delta composite code phase swings. It is desirable to transition to a Gain term of 50 as quickly as possible. It should be observed that when the Gain term of equation 18 changes, the bias term changes immediately, the changed gain of the average error of the first term of equation 18 requires additional time to catch up. Said another way, changing the Gain term of equation 18 introduces a "bias step" that takes some time to work itself out, which time depends on the size of the Gain term. For example, it is possible to transition from a Gain term of 10 to a Gain term of 50 in increments of 10 Gain units per 20 seconds, beginning at 120 seconds by using the following algorithm:

$$\text{Gain}=\text{MIN}[50,10+\text{FLOOR}(\text{MAX}(((t_2-t_1)-100)/20))\times 10] \quad \text{(Equation 19)}$$

In equation 19, for $t_2-t_1$ less than 120 seconds, the minimum Gain is 10. The MAX function obviates negative time by comparing against zero. The FLOOR function maintains integer multiples of 20 seconds. Using equation 19, Gain is 10 until 120 seconds, at which time Gain becomes 20 until 140 seconds. Gain increases in increments of 10 each 20 seconds until Gain has transitioned to 50. Equation 19 is a proposed method of transitioning from a small Gain term to a large Gain term without introducing a large (greater than approximately 40 chips) composite code phase difference between θGPS and θMod.

Figure 4:
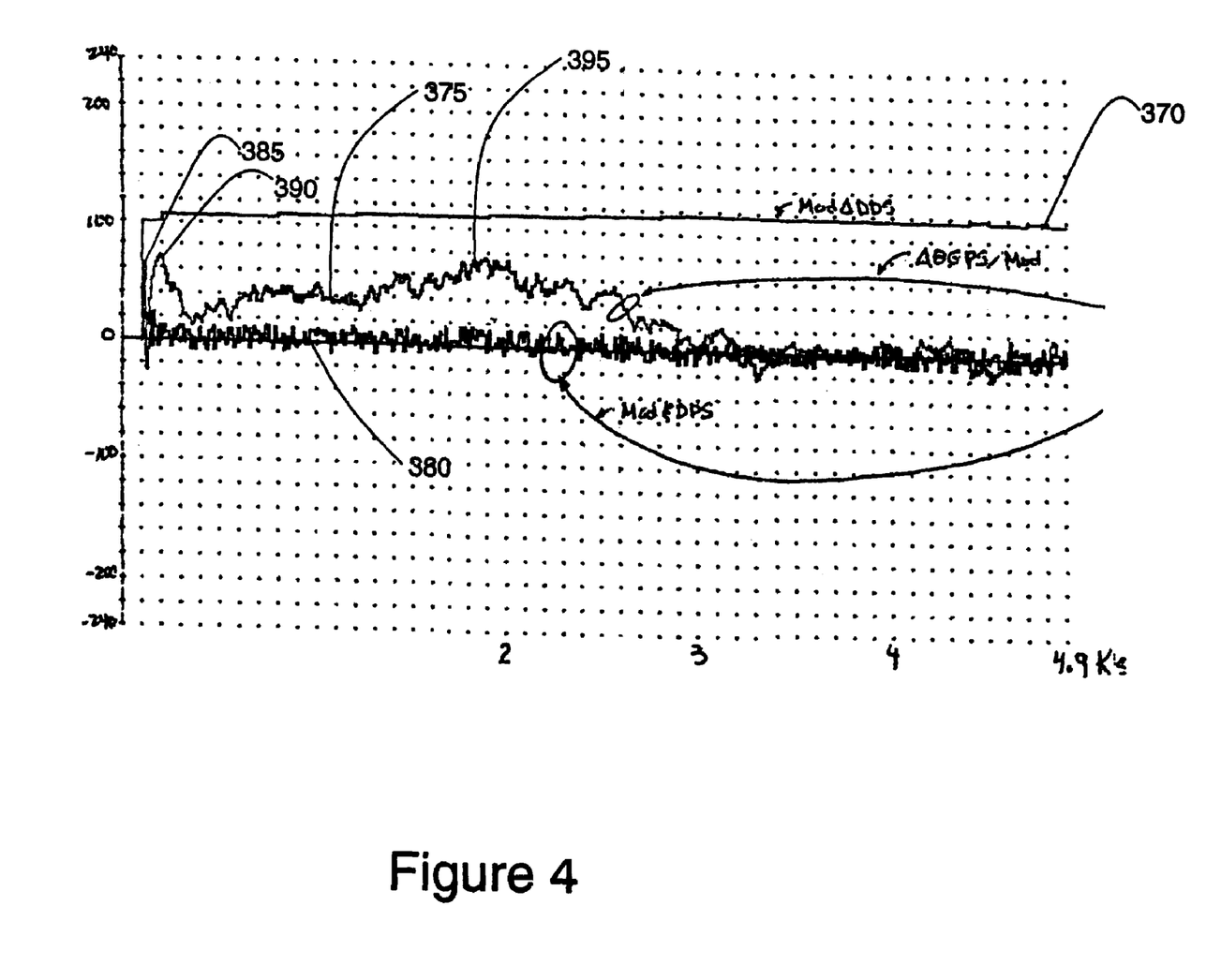
FIGS. 4 and 5 show the results of simulating the operations of pre-compensation circuitry.

FIG. 4 shows the results of simulating the operations of pre-compensation circuitry 192 as described above. The simulation parameters include a +1E−7 clock disagreement, and +1E−8/30 minutes gradient for the first 30 minutes of the simulation resulting in a final disagreement of +1.1E−7 after 30 minutes.

Clock correction term ModΔDDS 370 is based on integration times as long as 2,900 seconds in units of DDS LSBs. In the simulation of FIG. 4, phase maintenance does not begin until clock correction has been calculated and implemented at 100 seconds.

ΔθGPS/Mod 375, the composite code phase difference between θGPS (GPS composite code phase) and θMod (transmit modulator composite code phase), as shown, stays above the abscissa for approximately 3,000 seconds. ΔθGPS/Mod 375 represents the true clock disagreement between GPS time and PN code phase time.

Phase maintenance term ModξDDS 380 is also shown. The Gain parameter of ModξDDS 380 transitions from 10 to 50 in increments of 10 per 20 seconds beginning at 120 seconds. The ΔθGPS/Mod term error at 100 seconds 385 is due to initial uncertainty of 1 µs in determining ΔθGPS/Mod 375 (expressed in sampling clocks). The ΔθGPS/Mod term error at 200 seconds 390 is due to transition from a Gain term of 10 to 50. ΔθGPS/Mod 375 peaks at approximately 1800 seconds 395, the time at which the gradient ends, and diminishes thereafter. A larger gain term is less able to track gradients. A smaller gain term increases the rate of phase accumulation as shown by variance ΔθGPS/Mod 375. A Gain term of 50 allows for the disclosed gradient and keeps ΔθGPS/Mod 375 within approximately ±80 sampling clocks (±40 chips at 120 Mc/s).

Figure 5:
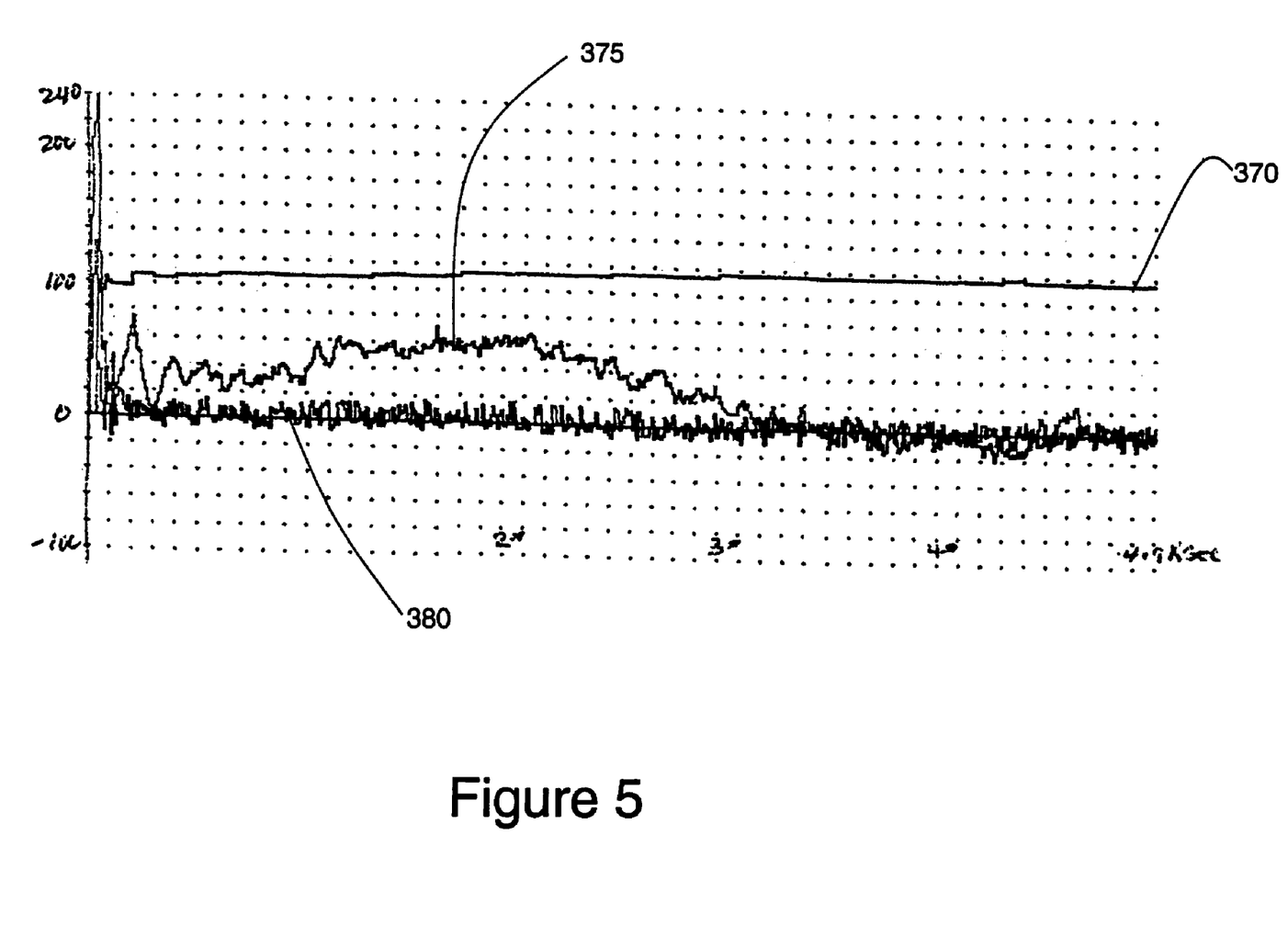

FIG. 5 shows a simulation of essentially the same operations as FIG. 4, with the notable exception that phase maintenance begins without the benefit of a long-term clock correction term. As in FIG. 4, the Gain parameter of ModξDDS 380 transitions from 10 to 50 in increments of 10 per 20 seconds beginning at 120 seconds. Note that in FIG. 5, ΔθGPS/Mod 375 grows to 240 sampling clocks prior to introduction of the long-term clock correction term, ModΔDDS 370.

It should be recognized that in digital communication system 10 (FIG. 1), each platform 15, 20 generates its nominal carrier frequencies (F) relative to its platform reference oscillator 193 (FIG. 2). A portion of any changes in carrier frequencies (ΔF) detected by a receiving platform is due to the accuracy differences between the reference oscillators of the receiving and transmitting platforms. Those accuracy differences cause slightly different nominal frequencies among platforms.

In addition, differences in carrier frequencies are also caused by a separation rate-of-change between platforms, also referred to as the Doppler effect. During initialization of the components of digital demodulator system 100, link control processor 300 may issue an initialization command that includes a nominal carrier frequency F and carrier Doppler coefficients used to correct for Doppler effects. A reverse Doppler algorithm is provided that operates at the nominal carrier frequency F, as opposed to the chipping rate, for detecting deviations ΔF from the nominal carrier frequency F.

If tests are being performed at 1700 MHz (nominal), the carrier Doppler coefficients should closely reflect the frequency at which Doppler effects are taking place. Ideally, the carrier Doppler coefficients should absolutely reflect the frequency at which Doppler effects are taking place, otherwise, the above described clock correction procedures and the reverse Doppler algorithm interpret detected ΔF incorrectly.

As an example, a nominal carrier Doppler coefficient for 1700 MHz could be 1A1A hex. 1700 MHz÷582,749,918.359 knots×$2^{20}$÷3÷$5^7$×512=6682 decimal, where $2^{20}$÷3÷$5^7$ converts hertz into DDS LSBs, and a carrier Doppler coefficient LSB is one $512^{th}$ of a DDS LSB. Following the same conversion process, the carrier Doppler coefficient for 10 GHz is 39308 decimal, 998C hex.

As another example, assume that $A_{CLK}$ of central platform 15 (FIG. 1) is −5E−8, and assume that $A_{CLK}$ of terminal platform 20 (FIG. 1) is +7E−8. Thus, the relative difference between the two platforms is 1.2E−7. When receiving, terminal platform 20 perceives −1200 Hz of Doppler (10 GHz× 1.2E−7) due to clock disagreement, that is, terminal platform 20 perceives that the received carrier is 1200 Hz slower than its own nominal carrier. To terminal platform 20, ΔF is ΔF, and it is all interpreted as occurring at the carrier frequency due to a separation rate-of-change between terminal platform 20 and central platform 15. Assuming a 10 GHz RF carrier frequency, −1200 Hz is interpreted by the reverse Doppler algorithm as −69.93 knots (−1200 Hz÷17.16 Hz/knot, where 10 GHz÷582,749,918 knots=17.16 Hz/knot, and where 582, 749,918 is the speed of light in knots). The reverse Doppler algorithm increases the speed of the terminal platform's transmit chipping rate by +14.4 c/s (assuming 120 Mc/s, 120 Mc/s÷582,749,918 knots=0.2059 c/knot. 69.93 knots× 0.2059 c/knot=14.4 c/s). Therefore, despite the best efforts of the clock correction and phase maintenance techniques, and if left unattended, reverse Doppler adds a 14.4 c/s error to the terminal platform's transmitted chipping rate (Clock Correction slows the terminal's transmitted chipping rate by 8.4 c/s: 120 Mc/s×7E−8=8.4 c/s.)

Central platform 15 and terminal platform 20 each has an $A_{CLK}$ term, but neither is aware of the other's $A_{CLK}$. For example, when receiving, terminal platform 20 is unaware of how much of the clock-disagreement-caused ΔF is due to its platform reference oscillator accuracy or how much is due to the platform reference oscillator accuracy of central platform 15.

Clock-disagreement-caused ΔF can be eliminated. Central platform 15 may correct its nominal carrier as follows:

$$\text{DDS\_RF\_CMD} = \text{DDS\_RF\_NOM} + \frac{\text{Mod}\Delta DDS}{\text{Samp\_rate}} \times \text{CarrierDopplerCoeficient} \times \frac{582,749,918 \text{ knots}}{512} \quad \text{(Equation 20)}$$

In equation 20, ModΔADDS÷Samprate is generally equal to $-A_{CLK}$ (see equation 14). Therefore, in this instance, a platform may use ModΔDDS to correct its nominal carrier, relative to GPS. Assuming a nominal carrier of 10 GHz, equation 20 calculates an increase of 500 Hz to central platform's carrier (10 GHz×5E−8=500 Hz). With central platform's carrier corrected to GPS accuracy, when receiving, terminal platform 20 perceives −700 Hz of ΔF (−1200+500=−700). The −700 Hz of perceived Doppler is interpreted as −40.79 knots and causes the reverse Doppler algorithm to increase terminal platform's transmitted chipping rate by +8.4 c/s (40.79 knots×0.2059 c/knot=8.4 c).

Terminal platform 20 may correct for this error by doubling the ModΔDDS term because the clock-disagreement portion of ΔF detected by digital demodulator system 100 is equivalent to the clock disagreement ($A_{CLK}$, signed clock accuracy) times the nominal carrier frequency indicated in the initialization command issued by link control processor 300.

The reverse Doppler algorithm, in turn, changes the transmitted chipping rate (tx_samp_rate in DDS LSBs) by an amount equal to $A_{CLK}$ times tx_samp_rate, which is exactly equal to ModΔDDS but with the opposite sign.

ModΔDDS is the amount by which the clock correction technique corrects the transmitted chipping rate (in units of DDS LSBs). Clock correction is performed independently of the reverse Doppler algorithm and detects, within approximately 100 seconds of operation, the clock disagreement between platform reference oscillators 193.

Because the reverse Doppler algorithm negates the effect of clock correction, ModΔDDS should be doubled when utilizing the reverse Doppler algorithm. In this example, ModΔDDS reduces the terminal's chipping rate by 8.4 c/s (relative to the example being pursued), undoing the damage caused by the reverse Doppler algorithm in response to clock-disagreement-caused ΔF.

Putting all of the above terms together, the sampling clock command becomes:

$$\text{Samprate}_{Instantaneous} = \text{samprate}_{nominal} + 2 \times \text{Mod}\Delta DDS + \text{Mod}\Delta DDS - \text{ReverseDopplerTerm} \quad \text{(Equation 21)}$$

Referring to equation 21, which applies to the terminal-to-central-platform chipping rate, ModΔDDS subtracts 8.4 c/s, and the Reverse Doppler Term adds 16.8 c/s. Overall, −8.4 c/s is added to the nominal chipping rate, which is the proper result regarding clock disagreement in an environment having no Doppler effects, such as when the platforms are stationary or static with respect to each other. It can be seen in equation 21 that real Doppler effects due to changes in separation between platforms is introduced in the Reverse Doppler Term and has the desired effect, the static clock disagreement term being compensated.

The sign in front of the Reverse Doppler Term changes, depending on IF or RF applications, due to an inversion in the X-band down conversion from RF to IF. The sense shown in equation 21 is for RF applications. Not every down converter causes an inversion, but it applies in the present invention.

Continuing with the example, the central platform's transmit modulator transmits 120 Mc/s. A terminal platform's correlator perceives the received chipping rate as some chipping rate different from that.

Note that the central platform corrects its transmitted chipping rate to GPS accuracy. So does the terminal platform, but a terminal still perceives its received chipping rate as some rate different from its own, based on clock disagreement between the terminal platform's platform reference oscillator 193 and the relative accuracy of the received chipping rate. The terminal platform's correlator is going to accumulate delta phase based on the disagreement between its reference platform oscillator clock accuracy the accuracy of the chipping rate being received.) The reverse Doppler algorithm and clock correction algorithm are not a function of received samprate Doppler. The most useful function that can be performed with the received samprate status, in the absence of Doppler effects that would otherwise contribute to other-than-nominal samprate, is to manually verify the proper calculation of ModΔDDS.

Figure 6:
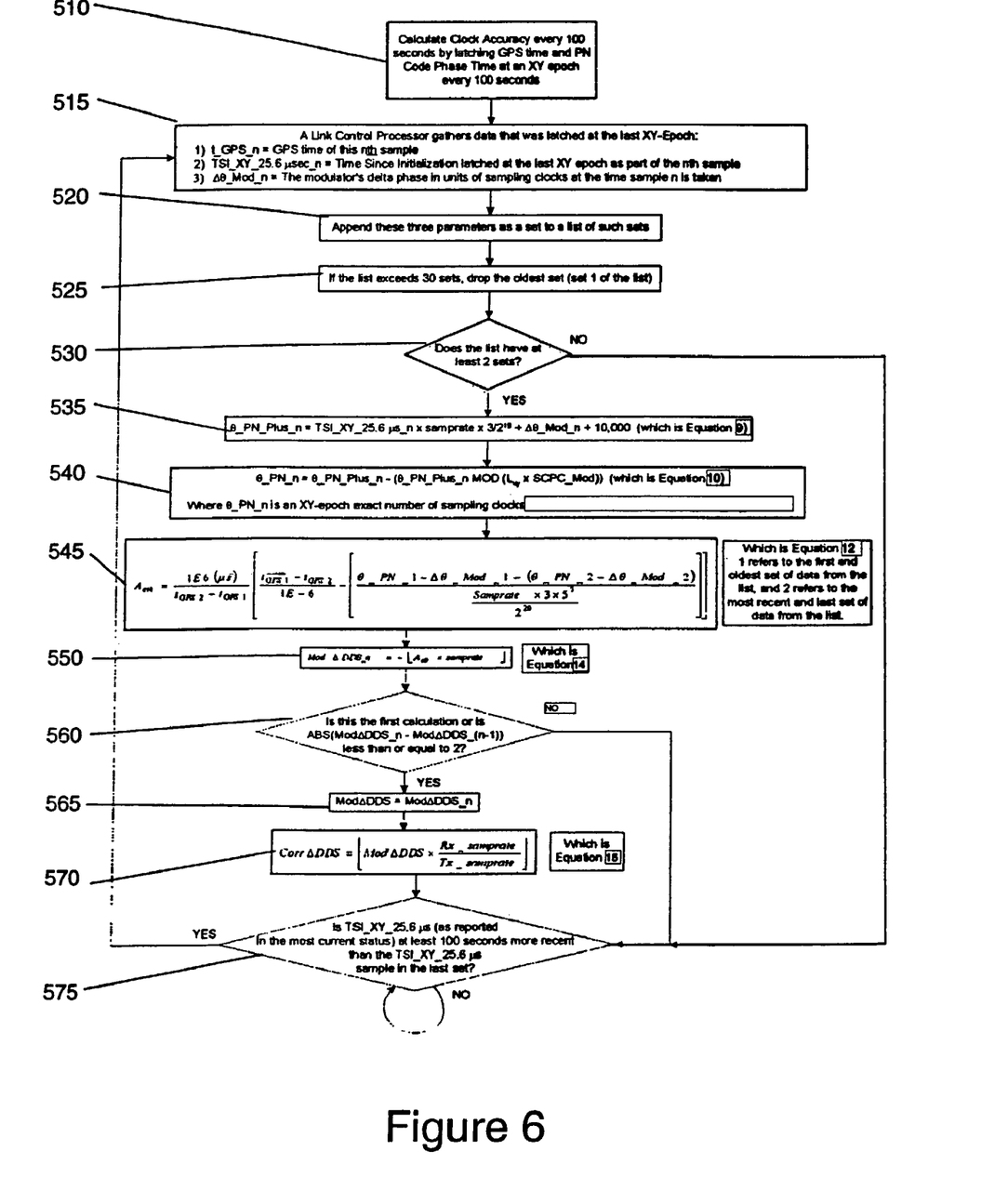
FIG. 6 is a flow chart of a procedure for synchronizing the output of a PN code generator to a timing signal.

FIG. 6 shows a flow chart of the portion of the adjustment method that includes bringing the chipping rate of PN code generator 190 into approximate agreement with GPS accuracy, referred to as the clock correction technique.

In block 510, the clock correction technique calculates clock accuracy by latching GPS time and PN code phase time at an XY epoch every 100 seconds. In block 515 link control processor 300 gathers data latched at the last XY epoch including GPS time, TSI, and $\Delta\theta\_Mod\_n$. The data is appended as a set to a list in block 520 and, if the list exceeds 30 sets, the oldest set is dropped in block 525.

As shown in block 530, if the list does not include at least 2 sets, the clock correction technique proceeds to block 570, otherwise the latched data is used in equation 9 to calculate $\theta\_PN\_Plus\_n$ (block 535) and in equation 10 to calculate $\theta\_PN\_n$ (block 540). In block 545, the results are used in equation 12 to calculate $A_{CLK}$, where 1 designates data from the oldest set presently in the list and 2 designates data from the newest set presently in the list. In block 550, the adjustment term for DDS 125 (FIG. 2), ModΔDDS, is calculated using equation 14. In block 560, if this is not the first calculation of ModΔDDS, or if the absolute value of ModΔDDS_n–ModΔDDS_n–1 is not less than or equal to 2, the clock correction technique proceeds to block 575, otherwise ModΔDDS is used to calculate the adjustment term for PN code generator 190, CorrΔDDS, using equation 10, as shown in block 565.

In block 575, if TSI_XY_25.56us as reported in the most current status is at least 100 seconds more recent than TSI_XY_25.56us in the last set of the list, the clock correction technique proceeds to block 515 and begins again, otherwise the clock correction technique remains at block 575 until TSI_XY_25.56us is no longer at least 100 seconds more recent than TSI_XY_25.56us in the last set of the list TSI_XY_25.56us, and then proceeds to block 515.

Figure 7:
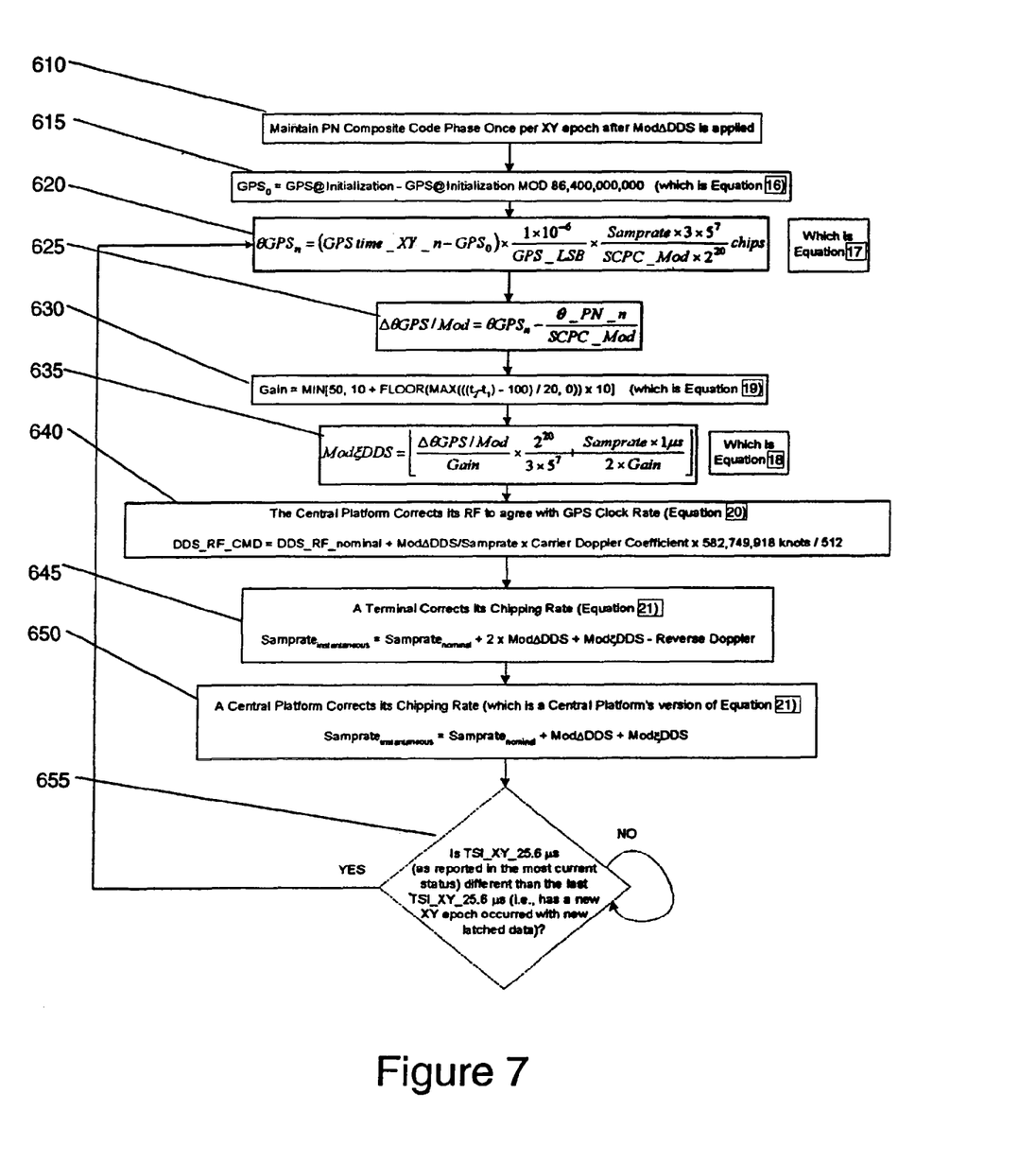
FIG. 7 is a flow diagram of a procedure for maintaining a PN code phase with the timing signal.

As mentioned above, to maintain the composite PN code phase of PN code generator 190 at GPS time of day, the adjustment method utilizes a phase maintenance technique. Turning to FIG. 7, a flowchart is shown of the portion of the adjustment method that includes the phase maintenance technique.

In block 610, the phase maintenance technique is performed once per XY epoch after ModΔDDS has been applied. In block 615, a modulo GPS day is defined using equation 16. GPS code phase at the sample, $\theta GPS_n$, is determined using equation 17 in block 620.

Assuming that at this point the composite code phase difference between GPS and the platform's transmit modulator's PN code, $\Delta\theta GPS/Mod$, is equal to $\theta GPS_n - \theta Mod_n$, $\Delta\theta GPS/Mod$ may be calculated from $\theta GPS_n$ (Equation 17) and $\theta\_PN_n$ (Equation 10). As shown in block 625, $\Delta\theta GPS/Mod$ is determined by using $\theta GPS_n$ directly and by dividing $\theta\_PN_n$ by SCPC_Mod (Sampling Clocks Per Chip) to convert $\theta\_PN_n$ from sampling clock units to chips.

In block 630, a Gain term is calculated using equation 19 which operates to yield a Gain of 10 for a period of 120 seconds, and then a Gain of 20 until 140 seconds is reached, after which Gain increases in increments of 10 every 20 seconds until Gain reaches 50. In block 635, the Gain terms are used in equation 18 to produce the ModξDDS term. The central platform corrects its carrier using terms resulting from equation 20 as shown in block 640. In block 645, the terminal corrects its chipping rate with terms from equation 21, and in block 650, the central platform corrects its chipping rate using terms from equation 21 modified to omit reverse Doppler calculations. In block 655, if TSI_XY_25.56us as reported in the most current status is different from TSI_XY_25.56us in the last set of the list, that is, if a new XY epoch has occurred with new latched data, the phase maintenance technique proceeds to block 620. If a new XY epoch has not occurred, the phase maintenance technique remains at block 655 until another epoch occurs.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of acquiring a burst code signal comprising:
receiving the burst code signal, wherein the burst code signal has been synchronized to an external GPS time of day signal and then transmitted;
utilizing a pseudo noise code generator to generate a plurality of pulse trains, each having a 1 bit weight and a different timing;
adjusting a pseudo noise code phase of the pseudo noise code generator to have the same phase as the pseudo noise code generator would have had the pseudo noise code generator begun at the beginning of a GPS day and progressed at a nominal chipping rate different from GPS chipping rate;
simultaneously comparing the received burst code signal to each of the plurality of pulse trains; and
detecting which of the pulse trains is a closest temporal match to the burst code signal.

2. The method of claim 1, wherein adjusting a pseudo noise code phase of the pseudo noise code generator comprises maintaining a composite pseudo noise code phase of the pseudo noise code generator substantially coincident with a phase of the external GPS time of day signal.

3. The method of claim 1, wherein adjusting a pseudo noise code phase of the pseudo noise code generator further comprises bringing the chipping rate of a pseudo noise code generator approximately to the accuracy of the external GPS time of day signal.

4. The method of claim 3, wherein adjusting a pseudo noise code phase of the pseudo noise code generator further comprises maintaining a composite PN code phase of the PN code generator substantially at a GPS time of day.

5. The method of claim 1, wherein simultaneously comparing the burst code signal to each of the plurality of pulse trains includes generating a correlation value for each comparison.

6. The method of claim 5, wherein detecting which of the pulse trains is a closest temporal match is performed by comparing the correlation values.

7. The method of claim 5, wherein simultaneously comparing the burst code signal to each of the plurality of pulse trains utilizes a finite impulse response filter having an impulse response time.

8. The method of claim 1, wherein the burst code signal is spread using a code different than any GPS code.

9. The method of claim 1, further comprising receiving a timing signal corresponding to GPS time of day, wherein the timing signal and the burst signal are received via different antennas.

10. A method of acquiring a burst code signal comprising:
receiving the burst code signal, wherein the burst code signal has been synchronized to an external timing signal and then transmitted;
generating a plurality of pulse trains, each having a different timing;
simultaneously comparing the received burst code signal to each of the plurality of pulse trains, wherein the plurality of generated pulse trains are synchronized to the external timing signal; and
detecting which of the pulse trains is a closest temporal match to the burst code signal,
wherein simultaneously comparing the burst code signal to each of the plurality of pulse trains includes generating a correlation value for each comparison, and
wherein simultaneously comparing the burst code signal to each of the plurality of pulse trains utilizes a finite impulse response filter having an impulse response time, and
wherein the burst code signal and the plurality of pulse trains are synchronized to be within the impulse response time.

11. The method of claim 10, wherein the pulse trains are composite codes.

12. A digital communication system comprising a plurality of platforms, each platform including:
a pseudo noise code generator for generating a plurality of pulse trains, each having a different timing;
pre-compensation circuitry for correcting a clock rate of the pseudo noise generator to approximate a clock rate of an external timing signal, and for maintaining a composite pseudo noise code phase of the pseudo noise code generator substantially coincident with a phase of the external timing signal;
correlation circuitry for simultaneously correlating a received burst code signal with each of the plurality of pulse trains, wherein the received burst code signal has been synchronized to the external timing signal before being transmitted; and
detection circuitry for detecting which of the pulse trains is a closest temporal match to the received burst code signal,
wherein the correlation circuitry comprises a finite impulse response filter having an impulse response time, and
wherein the pre-compensation circuitry synchronizes the plurality of pulse trains to be within the impulse response time.

13. The system of claim 12, wherein the pulse trains are composite codes.

14. A digital communication system comprising:
circuitry for receiving a burst code signal that has been synchronized with an external GPS time of day signal and then transmitted;
a pseudo noise code generator for generating a plurality of pulse trains, each having a 1 bit weight and a different timing;
pre-compensation circuitry for adjusting a pseudo noise code phase of the pseudo noise code generator to have the same phase as the pseudo noise code generator would have had the pseudo noise code generator begun at the beginning of a GPS day and progressed at a nominal chipping rate different from GPS chipping rate;
comparison circuitry for simultaneously comparing the received burst code signal to each of the plurality of pulse trains; and
detection circuitry for detecting which of the pulse trains is a closest temporal match to the received burst code signal.

15. The system of claim 14, wherein the pre-compensation circuitry comprises an output signal for bringing a chipping rate of the pseudo noise code generator into approximate agreement with the accuracy of the external time of day signal.

16. The system of claim 15, wherein the pre-compensation circuitry further comprises an output signal for maintaining the pseudo noise code phase of the pseudo noise code generator substantially coincident with a phase of the external GPS time of day signal.

17. The system of claim 15, wherein the pre-compensation circuitry comprises an output signal for bringing a chipping rate of the pseudo noise code generator into approximate agreement with the accuracy of the external GPS time of day signal.

18. The system of claim 15, wherein the pre-compensation circuitry further comprises an output signal for maintaining a composite pseudo noise code phase of the pseudo noise code generator substantially at a GPS time of day.

19. The system of claim 14, wherein the comparison circuitry generates a correlation value for each comparison.

20. The system of claim 19, wherein the detection circuitry detects which of the pulse trains is a closest temporal match to the received burst code signal by comparing the correlation values.

21. The system of claim 19, wherein the comparison circuitry comprises a finite impulse response filter having an impulse response time.

22. The system of claim 14, wherein the pseudo noise code generator generates a pulse train different than any GPS code.

23. The system of claim 14, further comprising a first antenna for receiving the burst signal and a second antenna for receiving the GPS time of day signal.

24. A digital communication system comprising:
circuitry for receiving a burst code signal that has been synchronized with an external timing signal and then transmitted;
a generator for generating a plurality of pulse trains, each having a different timing;
pre-compensation circuitry for synchronizing the plurality of pulse trains to the external timing signal;
comparison circuitry for simultaneously comparing the received burst code signal to each of the plurality of pulse trains, wherein the received burst code signal is synchronized to the timing signal; and
detection circuitry for detecting which of the pulse trains is a closest temporal match to the received burst code signal, wherein the comparison circuitry generates a correlation value for each comparison, and wherein the comparison circuitry comprises a finite impulse response filter having an impulse response time, and wherein the pre-compensation circuitry synchronizes the plurality of pulse trains to be within the impulse response time.

25. The system of claim 24, wherein the pulse trains are composite codes.

26. A method of acquiring a burst code signal comprising:

receiving the burst code signal after it has been synchronized with an external GPS time of day signal and then transmitted;

generating a plurality of pulse trains using a pseudo noise code generator, wherein each of the pulse trains has a 1 bit weight and a different timing;

adjusting a chipping rate of the pseudo noise code generator to have the same chipping rate as the pseudo noise code generator would have had the pseudo noise code generator begun at the beginning of a GPS day and progressed at a nominal chipping rate using a reference oscillator used for generating the GPS time of day signal;

maintaining a composite pseudo noise code phase of the pseudo noise code generator substantially coincident with a phase of the external GPS time of day signal;

simultaneously comparing the received burst code signal to each of the plurality of pulse trains; and detecting which of the pulse trains is a closest temporal match to the received burst code signal.

27. The method of claim 26, wherein adjusting the chipping rate of the pseudo noise code generator comprises bringing the chipping rate of the pseudo noise code generator approximately to the accuracy of the GPS timing signal.

28. The method of claim 27, wherein adjusting the chipping rate of the pseudo noise code generator further comprises maintaining a composite PN code phase of the PN code generator substantially at a GPS time of day.

29. A digital communication system comprising a plurality of platforms, each platform including:

a pseudo noise code generator for generating a plurality of pulse trains, each having a 1 bit weight and a different timing;

pre-compensation circuitry for adjusting a chipping rate of the pseudo noise code generator to have the same chipping rate as the pseudo noise code generator would have had the pseudo noise code generator begun at the beginning of a GPS day and progressed at a nominal chipping rate different from GPS chipping rate;

correlation circuitry for simultaneously correlating a received burst code signal with each of the plurality of pulse trains, wherein the received burst code signal has been synchronized to the GPS timing signal before being transmitted; and detection circuitry for detecting which of the pulse trains is a closest temporal match to the received burst code signal.

30. The system of claim 29, wherein the pre-compensation circuitry comprises an output signal for bringing the chipping rate of the pseudo noise code generator into approximate agreement with the accuracy of the GPS timing signal.

31. The system of claim 29, wherein the pre-compensation circuitry further comprises an output signal for maintaining the composite pseudo noise code phase of the pseudo noise code generator substantially at a GPS time of day.

32. The system of claim 29, wherein the correlation circuitry comprises a finite impulse response filter having an impulse response time.

33. The system of claim 29, wherein the pseudo noise code generator generates a pulse train different than any GPS code.

34. The system of claim 29, further comprising a first antenna for receiving the burst signal and a second antenna for receiving the GPS time of day signal.

* * * * *